United States Patent
Toner

(10) Patent No.: US 6,502,827 B1
(45) Date of Patent: Jan. 7, 2003

(54) SEALING DEVICE AND A METHOD OF REPAIRING/REPLACING SEALING DEVICES

(75) Inventor: Michael Toner, Napier (NZ)

(73) Assignee: GRM Distributors Limited, Hastings (NZ)

( * ) Notice: Subject to any disclaimer, the term of this patent is extended or adjusted under 35 U.S.C. 154(b) by 0 days.

(21) Appl. No.: 09/856,572
(22) PCT Filed: Dec. 13, 1999
(86) PCT No.: PCT/NZ99/00216
§ 371 (c)(1),
(2), (4) Date: May 23, 2001
(87) PCT Pub. No.: WO00/36321
PCT Pub. Date: Jun. 22, 2000

(30) Foreign Application Priority Data

Dec. 11, 1998 (NZ) .................................................. 333318
Aug. 6, 1999 (NZ) .................................................. 337130

(51) Int. Cl.⁷ .............................................. F16J 15/26
(52) U.S. Cl. ...................... 277/511; 377/500; 377/510; 377/511; 377/329
(58) Field of Search ................................ 377/329, 500, 377/510, 511

(56) References Cited

U.S. PATENT DOCUMENTS

| | | | | |
|---|---|---|---|---|
| 2,957,712 A | | 10/1960 | Farmer | |
| 3,434,728 A | | 3/1969 | Soldato | |
| 3,955,822 A | * | 5/1976 | Irby | 227/320 |
| 4,168,936 A | | 9/1979 | Scheller et al. | |
| 4,328,973 A | | 5/1982 | Delbridge | |
| 4,386,783 A | | 6/1983 | Davis | |
| 4,640,305 A | * | 2/1987 | Johnson | 137/312 |
| 4,960,039 A | * | 10/1990 | Robertson | 277/500 |
| 5,071,139 A | | 12/1991 | Warner | |
| 5,209,497 A | | 5/1993 | VonBergen et al. | |
| 5,267,736 A | * | 12/1993 | Pietsch | 277/306 |
| 5,642,892 A | | 7/1997 | Burgess | |
| 6,167,959 B1 | * | 1/2001 | Bassinger et al. | 166/84.2 |
| 6,325,387 B2 | * | 12/2001 | Shoemaker | 227/511 |
| 6,375,414 B1 | * | 4/2002 | Delaney | 415/111 |

FOREIGN PATENT DOCUMENTS

| | | |
|---|---|---|
| GB | 2256238 A | 12/1992 |
| NZ | 208121 | 2/1987 |

* cited by examiner

Primary Examiner—Anthony Knight
Assistant Examiner—Enoch E Peavey
(74) Attorney, Agent, or Firm—Workman, Nydegger & Seeley

(57) ABSTRACT

A sealing device (20, 80, 90), optionally in the form of a kit is provided for sealing about a rotatable member such as a shaft (22). The sealing device or the kit includes a follower housing (32) for mounting about the rotatable member (32) with an axial direction of the follower housing aligned with the rotational axis of the rotating member. Further, a follower (40, 40a, 40b) is provided for compressing a primary seal, such as packing (28), for sealing against the rotatable member. The follower is slidable within the follower housing generally in the axial direction and has sliding interfaces for interfacing with the follower housing and/or the rotatable member. There is also a chamber (68, 108) or simply a recess defined by the housing and a pressure face of the follower, with the chamber/recess being configured to receive fluid. A secondary seal (58) is also provided at the sliding interfaces for sealing against the egress of fluid in use, from the chamber/recess along the sliding interfaces of the follower.

31 Claims, 4 Drawing Sheets

SEALING DEVICE AND A METHOD OF REPAIRING/REPLACING SEALING DEVICES

FIELD OF THE INVENTION

The present invention relates to sealing devices. In particular, although not exclusively, the invention relates to a gland wherein fluid pressure is applied to energise the follower. The invention also relates to repair and replacement of conventional sealing devices.

BACKGROUND TO THE INVENTION

A conventional shaft sealing arrangement is illustrated in FIG. 1 and indicated by numeral 10. The shaft sealing arrangement 10 is arranged to provide a fluid seal around the shaft 11 where the shaft 11 exists the machine housing through a portion of the machine housing 12. The portion 12 defines an annular recess adjacent the shaft 11 in which packing 14 is provided. A gland follower 16 operates to compress the packing 14 within the recess. As the packing 14 is compressed axially ie parallel to the axis of the shaft 11, the packing 14 applies a radial force to the shaft 11, thereby sealing against the shaft. The gland follower 16 is secured to the portion 12 of the machine housing by bolts 18 and nuts 20. The nuts and bolts 18, 20 can also control the compressive force applied by the gland follower 16 to the packing 14. As shown, the shaft sealing arrangement 10 is conventionally assembled between the portion 12 of the machine housing and the bearing 13. The bearing 13 is retained in place by bearing bracket 15 secured by fasteners 17.

A disadvantage of this arrangement is that as the packing 14 wears the compressive force applied to the packing 14 will decrease. Therefore, regular maintenance checks are required. This may involve regular tightening of the nuts 20. The labour involved in maintaining conventional sealing arrangements 10 in operating order is therefore high.

The illustrated arrangement in FIG. 1 shows considerable space between the machine housing 12 and the bearing 13. This is not always the case and where the portion 12 is closely spaced to the bearing 13, difficulties will be encountered in accessing and tightening nuts 20. Further difficulties will also be encountered in repacking the packing 14 as required.

It is therefore an object of the present invention to provide a sealing device which overcomes or at least ameliorates some of the above mentioned disadvantages. Additionally, it is an aim of a preferred embodiment of the present invention to replace of the present invention is at least to provide the public with a useful choice.

SUMMARY OF THE INVENTION

In accordance with a first aspect of the invention, there is provided a sealing device for sealing about a rotatable member extending through a machine housing, the sealing device including: primary sealing means disposed in a recess of the machine housing for sealing against the rotatable member; a follower for compressing the primary sealing means; a follower housing connected to the machine housing and of annular form for mounting about the rotatable member with an axial direction of the follower housing aligned with the rotational axis of the rotatable member, wherein the follower housing includes inner and outer annular walls, with the follower having an annular body portion which is slidingly engageable with both the inner and outer annular walls, an annular chamber being defined by the inner and outer annular walls and a pressure face of the follower, the chamber having means to receive fluid; the follower being slidable within the follower housing generally in the axial direction and having sliding interfaces for interfacing with the inner and outer walls of the follower housing, there being further provided, secondary sealing means at the sliding interfaces for sealing against the egress of fluid from the chamber along the sliding interfaces of the follower.

The sealing device defined above may be used in any application where a conventional sealing device is used eg. pumps, augers, valves.

The primary sealing means may be in the form of packing conventionally used in sealing devices although other sealing means such as elastomeric rings are considered within the scope of the present invention.

Preferably the follower is in the form of an annular piston received within the follower housing. In a preferred form of the invention, the piston further includes an annular extension extending beyond the follower housing and into the recess in the machine housing. The follower may come in two or more parts such as two symmetrical halves to aid assembly.

The follower housing may come in two or more parts such as two symmetrical halves to aid assembly.

The secondary sealing means may be of any form although conventional piston rings are the preferred form.

The sealing device may be adapted to utilise any fluid such as air or hydraulic fluid for energising the follower. When the sealing device is used in applications transferring a clean liquid eg. water, oil or stream, a connection may be provided from the discharge of the transferring apparatus to the sealing device. In other applications, an independent fluid supply may be adopted. This might include a source of compressed air or a hydraulic system could be employed.

Additionally, control means may be provided to control the fluid pressure. Preferably the control means provides a constant fluid pressure to the chamber. Thus if the chamber starts to leak, further fluid will be provided to maintain the pressure and the sealing device remains in operation. The control system may be adapted to provide an alarm condition when the amount of further fluid reaches an unacceptable level. The control system may comprise a P.L.C. with feedback. Alternatively, an air cylinder with a regulator may be appropriate.

In another preferred form of the invention, the follower may comprise two parts, a first packing portion and a second piston portion. The first packing portion maybe in the form of an annular body portion with an annular extension. The second piston portion may be in the form of an annular piston. The two portions may be held in spaced configuration by a biasing means urging the two portions apart, such as a spring. Moreover, instead of an open fluid system whereby the chamber is supplied with fluid to a predetermined pressure, the fluid system may be essentially closed. For example, the follower housing may define a forward chamber between the first follower portion and the forward wall of the housing and a rear chamber between the second piston portion and the rear wall of the follower housing. The forward and rear chambers are interconnected for fluid flow therebetween. Furthermore, the pressure face of the first follower portion against which the fluid acts in use may be smaller than the pressure face of the second portion to maintain a greater force against the second portion than the first portion, this difference being balanced by the reaction force acting against the first follower by the packing. As the packing wears with a consequent reduction in the reaction force applied to the first follower portion, the greater force on the second follower portion urges both follower portions forwardly, with the force being transmitted through the spring to the first follower portion. This brings about a consequent reduction in the volume of the forward chamber. With the first and second chambers fluid-filled in use, a reduction in the volume of the forward chamber will cause fluid to flow to the second chamber. As the area of the pressure face of the second follower portion is greater than the first, the second follower portion will not move the same distance as the first follower portion. The spring thus takes up the slack between the two follower portions.

It will be appreciated that the various parts are unlikely to move in step-wise fashion as explained above. Rather, it is expected that the various parts of the device move gradually to retain equilibrium of the various forces acting on the various parts.

In accordance with a second aspect of the present invention, there is provided a kit for sealing about a rotatable member extending through a machine housing, the kit including: a follower for compressing packing which is disposed within a recess of the machine housing against the rotatable member; a follower housing connectable to the machine housing and of annular form for mounting about the rotatable member with an axial direction of the follower housing aligned with the rotational axis of the rotatable member, wherein the follower housing includes inner and outer annular walls, with the follower having an annular body portion which is slidingly engageable with both the inner and outer annular walls, an annular chamber being defined by the inner and outer annular walls and a pressure face of the follower, the chamber having means to receive fluid; the follower being slidable within the follower housing generally in the axial direction and having sliding interfaces for interfacing with the inner and outer walls of the follower housing, there being further provided, secondary sealing means at the sliding interfaces for sealing against the egress of fluid from the chamber along the sliding interfaces of the follower.

The preferred features recited above in connection with the first aspect of the invention may also have application in respect of the second aspect of the invention, including the feature of the two part follower.

The kit may be retro-fitted onto a rotatable member with a conventional sealing device. In so doing, the packing may be repacked. Preferably, the installation is achieved by removing the existing gland follower and nut of the conventional sealing device and replacing this with the kit as defined. The follower housing may be attached to the machine housing to which the gland follower was previously attached. This may be achieved by providing a portion of the follower housing as an attachment plate which is initially attached to the machine housing. The remaining portion of the follower housing is connectable to the attachment plate with the follower positioned to act against the packing.

In certain applications, there may be insufficient clearance between the machine housing and an adjacent bearing bracket to insert the follower housing and follower. In such cases, the kit may be installed by attaching the follower housing to the bearing bracket. An adaptor means may be provided for this purpose.

The secondary sealing means may be in any form although conventional piston rings are the most preferred.

The kit may also include means for applying fluid to the chamber.

In accordance with a third aspect of the present invention, there is provided a method of upgrading a conventional sealing device for a rotatable member extending through a machine housing where the conventional sealing device includes a gland follower attached to the machine housing and packing disposed in a recess of the machine housing against the rotatable member, the method including: removing the gland follower of the conventional sealing device; and installing a kit comprised of a follower and follower housing by attaching the follower housing to the machine housing, with the follower positioned to act against the packing, wherein the follower housing is of annular form for mounting about the rotatable member with an axial direction of the follower housing aligned with the rotational axis of the rotatable member, wherein the follower housing includes inner and outer annular walls, with the follower having an annular body portion which is slidingly engageable with the inner and outer annular walls, an annular chamber being defined by the inner and outer annular walls and a pressure face of the follower, the chamber having means to receive fluid, the follower being slidable within the follower housing generally in the axial direction and having sliding interfaces for interfacing with the inner and outer walls of the follower housing, there being further provided, secondary sealing means at the sliding interfaces for sealing against the egress of fluid from the chamber along the sliding interfaces of the follower.

Preferably the follower housing is installed by the use of an attachment plate forming part of the follower housing. The attachment plate may be connected in place of the existing gland follower(s). Optionally the same fastening means may be used. The remaining part of the housing may then be secured to the attachment plate. A threaded connection between the remaining part of the housing and the attachment plate may be provided for this purpose.

It will be appreciated that the use of the follower housing may take up additional space when compared with the existing sealing arrangement. In some applications therefore, there may be insufficient room between the machine housing and the bearing bracket for the replacement follower and follower housing to be installed given the required configuration of the replacement follower. In such applications, the follower housing may be secured to the bearing bracket by the use of an adaptor means.

In accordance with a fourth aspect of the present invention, there is provided a method of upgrading a conventional sealing device for a rotatable member extending through a machine housing where the conventional sealing device includes a gland follower attached to the machine housing and packing disposed in a recess of the machine housing against the rotatable member, with a bearing bracket positioned adjacent the machine housing, the method including; removing the gland follower of the conventional sealing device; and installing a kit comprised of a follower and follower housing by attaching the follower housing to the bearing bracket, with the follower positioned to act against the packing, wherein the follower housing is of annular form for mounting about the rotatable member with an axial direction of the follower housing aligned with the rotational axis of the rotatable member, wherein the follower housing includes inner and outer annular walls, with the follower having an annular body portion which is slidingly engageable with the inner and outer annular walls, an annular chamber being defined by the inner and outer annular walls and a pressure face of the follower, the chamber having means to receive fluid, the follower being slidable within the follower housing generally in the axial direction and having sliding interfaces for interfacing with the inner and outer walls of the follower housing, there being further provided, secondary sealing means at the sliding interfaces for sealing against the egress of fluid from the chamber along the sliding interfaces of the follower.

Either of the above methods may additionally include repacking the packing.

The replacement follower may take any of the forms described above in connection with the first aspect of the invention including the two part form.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF SUMMARY OF THE DRAWINGS

In order that the invention may be more full understood, some embodiments will now be described by way of example with reference to the drawings in which.

PREFERRED MODES OF CARRYING OUT THE INVENTION

Figure 2:
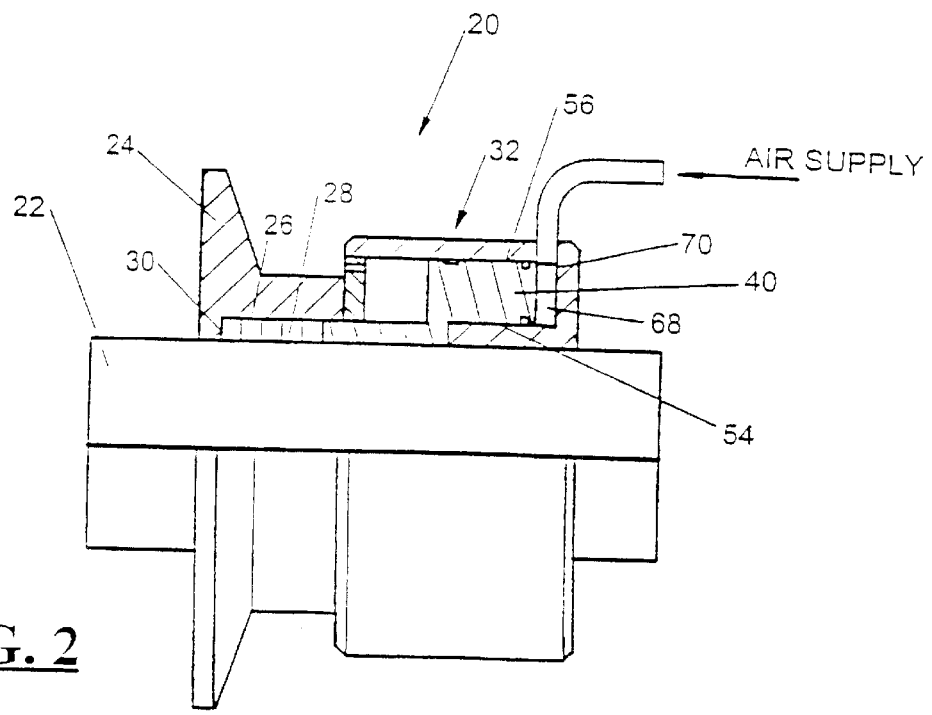
FIG. 2 is a part sectional view of a sealing device in accordance with a preferred embodiment of the present invention.

As illustrated in FIG. 2, the sealing device or gland 20 is assembled about a shaft 22. The assembly also includes a portion of the machine housing 24. The portion of the machine housing 24 is annular in form and extends about the shaft 22. As in the conventional sealing arrangement, the portion of the machine housing 24 includes an annular recess 26 which extends adjacent the shaft 22 for a small portion of the length of the shaft. The annular recess 26 receives primary sealing means 28 which may be in the form of conventional packing. The packing 28 abuts against an internal annular shoulder 30 defining part of the annular recess 26. The annular shoulder 30 constrains movement of the packing 28 along the shaft 22 in the leftward direction from the point of view shown in FIG. 2.

Figure 3:
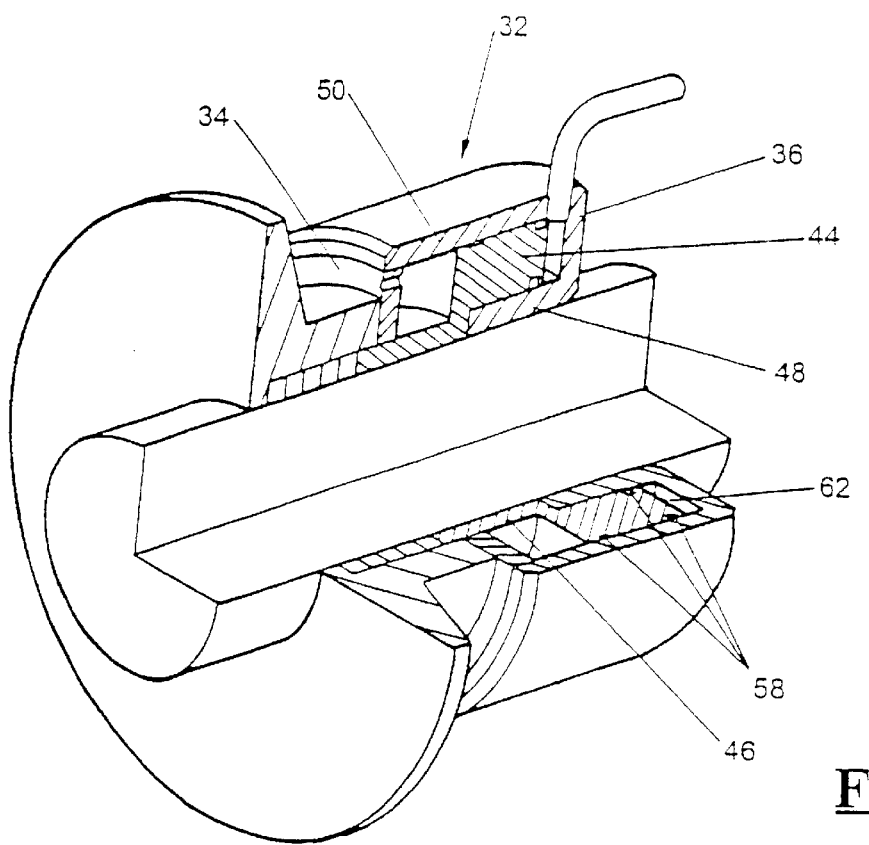
FIG. 3 is a perspective view, partially cut away, of the sealing device illustrated in FIG. 2.

A follower housing 32 is attached to the portion of the machine housing 24. As can be seen more clearly in FIG. 3, the follower housing 32 comprises an attachment plate 34 and a remaining portion in the form of an annular cylinder 36. The follower housing 32 is attached to the portion 24 of the machine housing by means of the attachment plate 34. A threaded connection is provided between the annular cylinder 36 and the attachment plate 34 to facilitate assembly of the follower housing 32.

Received in the follower housing 32 is a follower 40. As illustrated, the follower 40 has a first annular body portion 44 and a second annular extension portion 46. The body portion 44 is slidable within the annular cylinder 36 between opposing annular inner wall 48 and annular outer wall 50. The body portion 44 of the follower 40 has inner and outer sliding interfaces 54, 56 making sliding contact with the inner wall 48 and the outer wall 50 respectively. Secondary sealing means in the form of piston rings 58 are provided at the inner and outer interfaces 54, 56. and outer walls 48, 50 of the cylinder 36 and a pressure face 62 of the follower 40. The pressure face 62 is opposite the end wall of the cylinder 36.

The chamber 68 includes an inlet 70 for supply of compressed air. Preferably, a constant pneumatic pressure is applied to the chamber 68, acting against pressure face 62 of the follower 40.

The annular extension portion 46 extends through an annular gap provided between the attachment plate 34 and the shaft 22 to bear against the packing 28. It will be understood that with a constant pressure applied to the chamber 68, the follower 40 will be urged in the axial direction toward the packing 28. The extension portion 46 of the follower 40 will push axially against the packing 28 which is constrained from further movement by the annular shoulder 30. The resultant compression of the packing 28 applies a radial force to the shaft 22 to provide a seal about the shaft 22.

Figure 1:
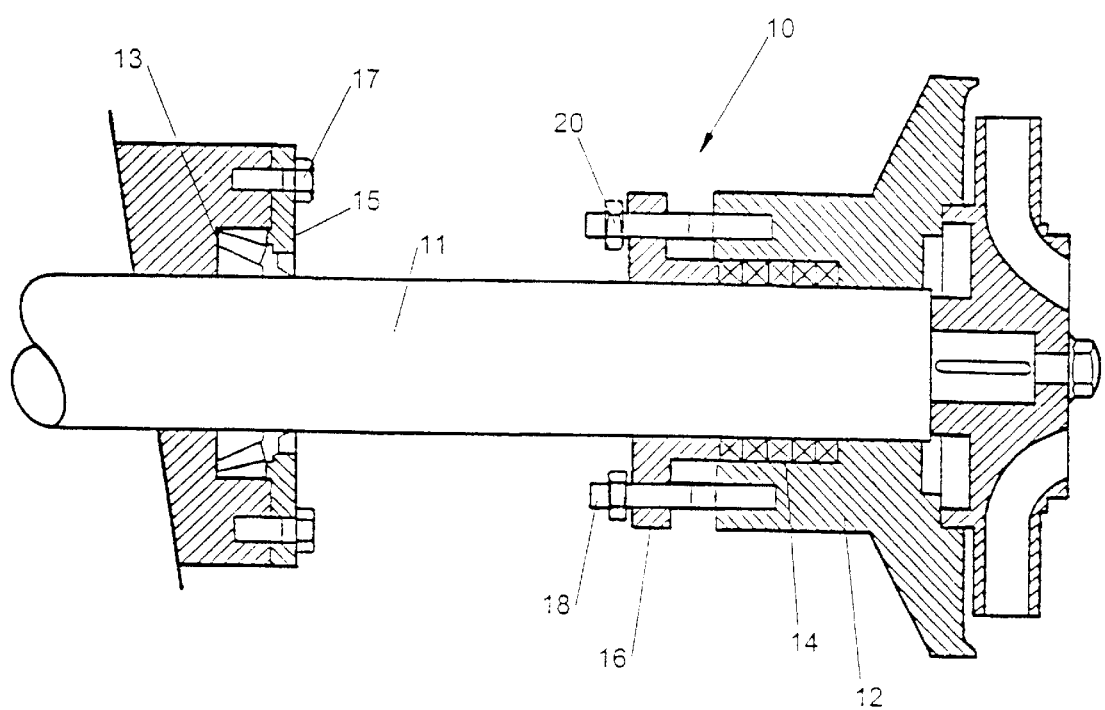
FIG. 1 is a sectional view of a conventional sealing device mounted on a shaft forming part of a machine.
Figure 4:
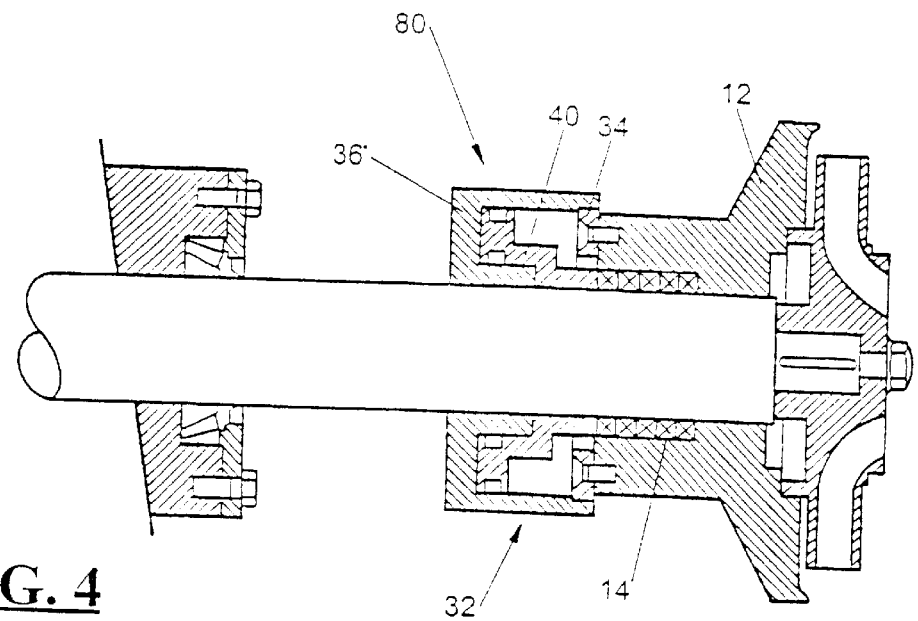
FIG. 4 is a sectional view of a sealing device in accordance with a second preferred embodiment of the present invention.

FIG. 4 illustrates a second preferred embodiment of a sealing device or gland 80 which is similar in many respects to the first embodiment of the sealing device 20 illustrated in FIGS. 2. Like numerals represent like parts. The sealing device 80 may be installed in place of the conventional sealing device 10 illustrated in FIG. 1. The sealing device 10 may be repaired or substantially replaced by removing the nuts 20 to release the tension in bolts 18 and to enable the gland follower 16 to be removed from the position illustrated. The gland follower 16 is suitably in two parts to aid in its assembly and effect removal. With the gland follower removed, the packing 14 may be repacked.

The conventional sealing device 10 is replaced by the sealing device or gland 80. As an initial step the attachment plate 34 is secured to the portion of the machine housing 12 through the use of the existing bolt holes. As shown, a threaded connection is provided between the attachment plate 34 and the cylinder 36. The follower housing 32 is thereby assembled in place with the replacement follower 40 operable to compress the packing 14. The air supply is then provided to the follower housing 32, in a similar manner to that illustrated in FIG. 2, although this is not illustrated in FIG. 4.

Figure 5:
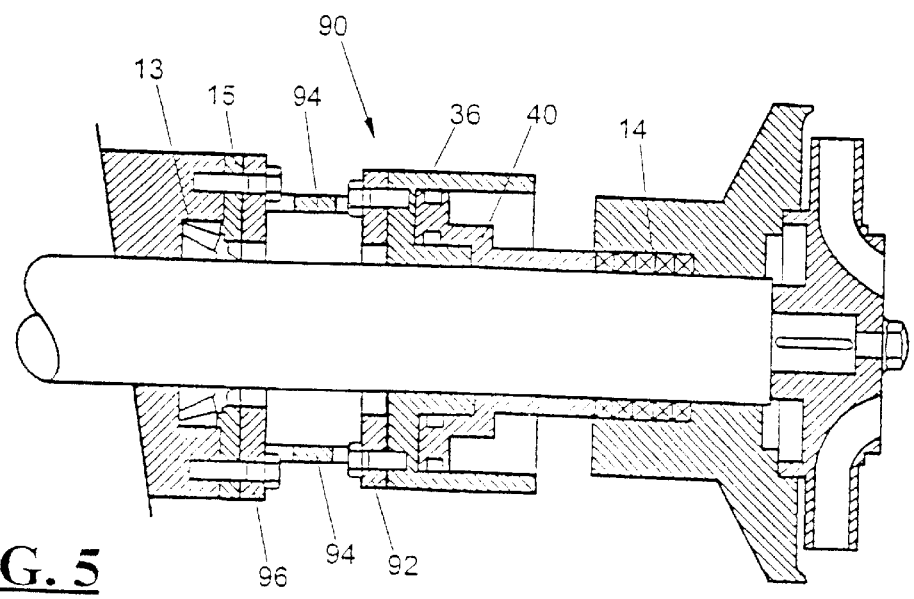
FIG. 5 is a sectional view of a sealing device in accordance with a third preferred embodiment of the present invention.

In the alternative embodiment illustrated in FIG. 5, the attachment plate 34 is dispensed with. Instead, an adapter means is used to connect the sealing device or gland 90 to the bearing bracket. An adapted plate 92 is secured to the end wall of the annular cylinder 36. this adapter plate 92 is then secured by means of connectors 94 and connector plate 96 40 to receive pressurised air to force the follower 40 to compress the packing 14.

Figure 6:
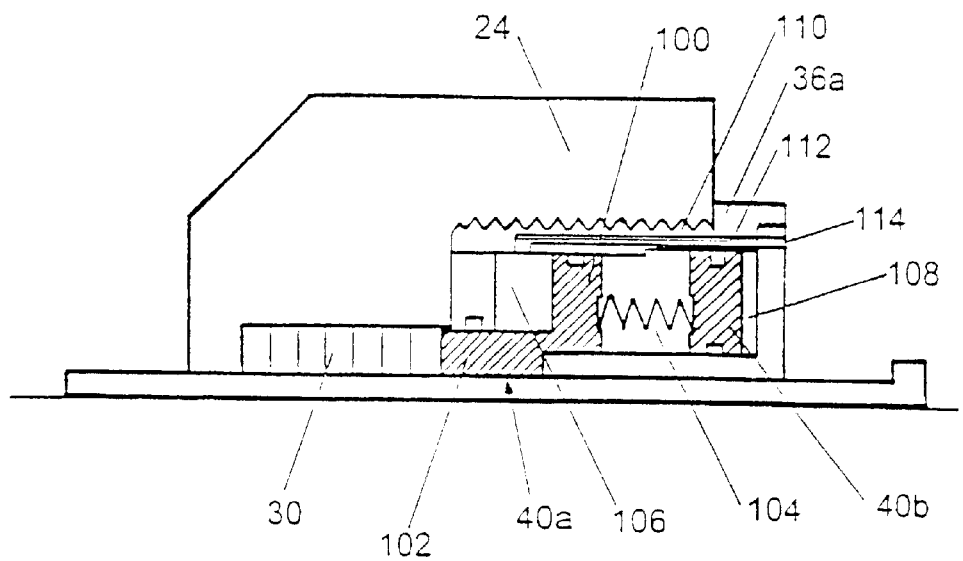
FIG. 6 is a sectional view of a sealing device in accordance with a fourth aspect of the present invention.
Figure 6:
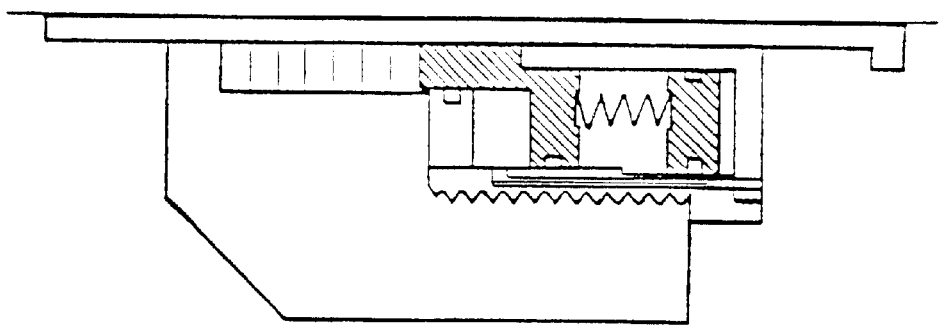

In the fourth embodiment illustrated in FIG. 6, the follower housing is defined in part by the machine housing 24 and an attachment portion 36a. The attachment portion 36a is externally threaded and the machine housing 24 is internally threaded for engagement will the internal thread of the attachment portion 36a. Inside the follower housing, the follower may comprise two parts, a first packing portion 40a and a second piston portion 40b. The first packing portion 40a may be in the form of an annular body portion 100 with an annular extension 102. The second piston portion 40b may be in the form of an annular piston. The two portions 40a, 40b may be held in a spaced configuration by a spring 104 biasing the two portions apart. The follower housing includes a forward chamber 106 between the first follower portion 40a and the forward wall of the machine housing 24 and a rear chamber 108 between the second piston portion 40b and the rear wall of the attachment portion 36a. The forward and rear chambers 106, 108 are interconnected by a passage 110 having a check valve 112.

The first and second chambers 106, 108 are oil-filled in use to a predetermined pressure. The filling may be achieved through port 114. The pressure face of the first follower portion 40a against which the fluid acts is smaller than the pressure face of the second portion 40b to maintain a greater force against the second portion 40b than the first portion 40a, this difference being balanced by the reaction force acting against the first follower 40a by the packing 30. As the packing 30 wears with a consequent reduction in the reaction force applied to the first follower portion 40a, the greater force on the second follower portion 40b urges both follower portions 40a, 40b forwardly, with the force being transmitted through the spring 104 to the first follower portion 40a. This brings about a consequent reduction in the volume of the forward chamber 106. With the first and second chambers 106,108 fluid-filled in use, a reduction in the volume of the forward chamber 106 will cause fluid to flow to the second chamber 108 along passage 110 through check valve 112. As the area of the pressure face of the second follower portion 40b is greater than the first 40a, the second follower portion 40b will not move the same distance as the first follower portion 40a. The spring 104 thus takes up the slack between the two follower portions 40a, 40b.

It will be appreciated that the various parts are unlikely to move in step-wise fashion as explained above. Rather, it is expected that the various parts of the device move gradually It will be understood that the above described only some embodiments of the present invention and modifications may be made thereto without departing from the scope of the present invention.

What is claimed is:

1. A kit for sealing about a rotatable member extending through a machine housing, the kit including:
    a follower housing connectable to the machine housing and of annular form for mounting about the rotatable member with an axial direction of the follower housing aligned with the rotational axis of the rotatable member, wherein the follower housing includes spaced apart inner and outer annular walls encircling the rotatable member;
    a follower for compressing packing which is disposed within a recess of the machine housing against the rotatable member, the follower having an annular body portion slidingly engageable with both the inner and outer annular walls of the follower housing, the follower being slidable within the follower housing generally in the axial direction and having sliding interfaces for interfacing with the inner and outer annular walls of the follower housing;
    an annular chamber encircling the rotatable member, the annular chamber being at least partially defined by the inner and outer annular walls of the follower housing and an annular pressure face of the follower, the chamber having means for receiving fluid; and
    secondary sealing means at the sliding interfaces for sealing against the egress of fluid from the chamber along the sliding interfaces of the follower.

2. The kit as claimed in claim 1 installed to connect to the machine housing.

3. The kit as claimed in claim 1 wherein the follower further includes an annular extension bearing against the packing.

4. The kit as claimed in claim 1 wherein the secondary sealing means are in the form of piston rings incorporated into the follower.

5. The kit as claimed in claim 1 including a source of fluid.

6. The kit as claimed in claim 5 further including control means adapted in use to allow the entry of additional fluid from the source to the chamber during operation to maintain a constant fluid pressure in the chamber.

7. The kit as claimed in claim 6 wherein the control system is adapted to provide an alarm condition when the rate of entry of additional fluid exceeds a predetermined threshold.

8. The kit as claimed in claim 5 wherein the source of fluid is an air cylinder and a regulator.

9. The kit as claimed in claim 1 wherein the follower comprises:
    a first follower portion adapted to act against the packing, and
    a second follower portion, the two portions being held in spaced configuration by a biasing means urging the two portions apart.

10. The kit as claimed in claim 9 wherein there is provided: a forward fluid chamber between a pressure face of the first follower portion and a forward wall of the housing; a rear fluid chamber between a pressure face of the second follower portion and a rear wall of the follower housing; the forward and rearward chambers being interconnected for fluid flow therebetween and adapted to operate as a closed system in normal use, wherein the pressure face of the first follower portion is smaller than the pressure face of the second portion.

11. The kit as claimed in claim 10 wherein:
    the first follower portion is in the form of an annular body portion with an annular extension adapted to act against the primary sealing means, and
    the second follower portion is in the form of an annular piston.

12. The kit as claimed in claim 9 wherein the biasing means is a spring.

13. The kit as claimed in claim 1 wherein the follower housing includes an attachment to secure the follower housing to the machine housing.

14. The kit as claimed in claim 1 further comprising an attachment to secure the follower housing to a bearing bracket adjacent the machine housing.

15. A method of installing the kit as claimed in claim 1 by retro-fitting the kit about a rotatable member previously fitted with a conventional sealing device.

16. A method of upgrading a conventional sealing device for a rotatable member extending through a machine housing where the conventional sealing device includes a gland follower attached to the machine housing and packing disposed in a recess of the machine housing against the rotatable member, the method comprising:
    removing the gland follower of the conventionally sealing device; and installing a kit comprised of a follower and follower housing by attaching the follower housing to the machine housing, with the follower positioned to act against the packing, wherein the follower housing is of annular form for mounting about the rotatable member with an axial direction of the follower housing aligned wit the rotational axis of the rotatable member, wherein the follower housing includes spaced apart inner and outer annular walls encircling the rotatable member, with the follower having an annular body portion slidingly engageable with both the inner and outer annular walls of the follower housing, an annular chamber encircling the rotatble member, the annular chamber being at lest partially defined by the inner and outer annular walls of the follower housing and an annular pressure face of the follower, the chamber having means for receiving fluid, the follower being slidable within the follower housing generally in the axial direction and having sliding interfaces for interfacing with the inner and outer annular walls of the follower housing, there being further provided, secondary sealing means at the sliding interfaces for sealing against the egress of fluid from the chamber along the sliding interfaces of the follower.

17. A method of upgrading a conventional sealing device for a rotatable member extending through a machine housing where the conventional sealing device includes a gland follower attached to the machine housing and packing disposed in a recess of the machine housing against the rotatble member, with a bearing bracket positioned adjacent the machine housing, the method comprising:

removing the gland follower of the conventional sealing device; and installing a kit comprised of a follower and follower housing by attaching the follower housing to the bearing bracket, with the follower positioned to act against the packing, wherein the follower housing is of annular form for mounting about the rotatable member with an axial direction of the follower housing aligned with the rotational axis of the rotatable member, wherein the follower housing includes spaced apart inner and outer annular walls encircling the rotatble member, with the follower having an annular body portion slidingly engageable with both the inner and outer annular walls of the follower housing, an annular chamber encircling the rotatable member, the annular chamber being at least partially defined by the inner and outer annular walls of the followed housing and an annular pressure face of the follower, the chamber having means for receiving fluid, the follower being slidable within the follower housing generally in the axial direction and having sliding interfaces for interfacing with the inner and outer annular walls of the follower housing, there being further provided, secondary sealing means at the sliding interfaces for sealing against the egress of fluid from the chamber along the sliding interfaces of the follower.

18. The method as claimed in claim 16 wherein the follower housing is installed by the use of an attachment plate forming part of the follower housing, the attachment plate being connected in place of the gland follower(s) with the remaining part of the housing being subsequently secured to the attachment plate.

19. The method as claimed in claim 17 wherein the follower housing is secured to the bearing bracket by the use of an adaptor device.

20. The method as claimed in claim 16 wherein an independent fluid supply is connected to the chamber.

21. A sealing device for sealing about a rotatable member extending through a machine housing, the sealing device comprising:

primary sealing means disposed in a recess of the machine housing for sealing against the rotatable member;

a follower for compressing the primary sealing means;

a follower housing connected to the machine housing and of annular form for mounting about the rotatable member with an axial direction of the follower housing aligned with the rotational axis of the rotatable member, wherein the follower housing includes spaced apart inner and outer annular walls encircling the rotatable member, with the follower having an annular body portion slidingly engageable with both the inner and outer annular walls of the follower housing, an annular chamber encircling the rotatable member, the annular chamber being at least partially defined by the inner and outer annular walls of the follower housing and an annular pressure face of the follower, the chamber having means for receiving fluid; and the follower being slidable within the follower housing generally in the axial direction and having sliding interfaces for interfacing with the inner and outer annular walls of the follower housing, there being further provided, secondary sealing means at the sliding interfaces for sealing against the egress of fluid from the chamber along the sliding interfaces of the follower.

22. The sealing device as claimed in claim 21 wherein the follower is in the form of an annular piston.

23. The sealing device as claimed in claim 22 wherein the piston has an annular body portion received in the follower housing and an annular extension.

24. The sealing device as claimed in claim 21 wherein the secondary sealing means are in the form of piston rings incorporated into the follower.

25. The sealing device as claimed in claim 21 wherein the sealing device is adapted to operate as an open system whereby the chamber receives fluid from a source external to the sealing device.

26. The sealing device as claimed in claim 25 wherein the sealing device is adapted to receive air from a source of compressed air.

27. The sealing device as claimed in claim 25 further comprising control means adapted in use to allow the entry of additionally fluid from the source to the chamber to maintain a constant fluid pressure in the chamber.

28. The sealing device as claimed in claim 27 wherein the control system is adapted to provide an alarm condition when the rate of entry of additional fluid exceeds a predetermined threshold.

29. The sealing device as claimed in claim 21 wherein the follower comprises:

a first follower portion adapted to act against the primary sealing means; and a second follower portion, the two portions being held in spaced configuration by a biasing means urging the two portions apart.

30. The sealing device as claimed in claim 29 wherein there is provided: a forward fluid chamber between a pressure face of the first follower portion and a forward wall of the housing; a rear fluid chamber between a pressure face of the second piston portion and a rear wall of the follower housing; the forward and rearward chambers being interconnected for fluid flow therebetween and adapted to operate as a closed system in normal use, wherein the pressure face of the first follower portion is smaller than the pressure face of the second portion.

31. The sealing device as claimed in claim 29 wherein the biasing means is a spring.

* * * * *